United States Patent [19]
Jaeger et al.

[11] Patent Number: 5,166,991
[45] Date of Patent: Nov. 24, 1992

[54] ELECTRO-OPTIC SWITCH WITH RESONATOR ELECTRODE

[75] Inventors: Nicolas A. F. Jaeger, Vancouver; Winnie C. Lai, Richmond; Mingche Chen, Vancouver, all of Canada

[73] Assignee: The University of British Columbia, Vancouver, Canada

[21] Appl. No.: 757,577

[22] Filed: Sep. 11, 1991

[51] Int. Cl.⁵ .............................................. G02B 6/26
[52] U.S. Cl. ...................................... 385/16; 385/9; 385/22; 385/40; 385/45
[58] Field of Search ................ 385/16, 22, 23, 40, 385/41, 45, 8, 9

[56] References Cited

U.S. PATENT DOCUMENTS

| | | | |
|---|---|---|---|
| 4,737,002 | 4/1988 | Boucouvalas | 385/41 X |
| 4,775,207 | 10/1988 | Silberberg | 385/8 |
| 5,033,811 | 7/1991 | Yanagawa et al. | 385/16 |

Primary Examiner—John D. Lee
Attorney, Agent, or Firm—C. A. Rowley

[57] ABSTRACT

An optical switch biasing flow of light between a main optical waveguide and one or the other of a pair of secondary waveguides extending from one axial end of the main waveguide to define a Y structure with the secondary waveguides symmetrically positioned with respect to the longitudinal axis of the main waveguide is provided. A resonant conductor having a pair of legs each of which is operatively associated with the main waveguide and its respective adjacent one of the secondary waveguides generates a resonant voltage that directs the flow of light between the main waveguide and the secondary waveguide associated with the leg having an appropriate voltage.

6 Claims, 1 Drawing Sheet

ELECTRO-OPTIC SWITCH WITH RESONATOR ELECTRODE

FIELD OF THE INVENTION

The present invention relates to an optical switch. More particularly the present invention relates to an optical switch incorporating a resonator to provide the biasing voltage and thereby reduce the power requirements for switching.

BACKGROUND OF THE INVENTION

Optical switching device for directing the flow of light through waveguides in a electro-optic material are well known. Mach-Zehnder switches require long electrodes and carefully controlled drive voltages. Y-branch switches with small branch angles also require long electrodes. Both types of switches operate at frequencies of a few Giga-Hertz (GHz) or less, unless employing travelling-wave electrode structures.

Y-branch switches with larger branch angles e.g. 2°, required shorter electrodes. Applicant has described such a device in a paper titled "Y-Branch Optical Modulator" OE/FIBERS '91 Boston Mass. Sep. 3 to 6, 1991, Jaeger et al and "The Effects of Branch Angle on a Y-Branch Optical Modulator" given at The First Graduate Student Conference on Opto-Electronic Materials, Devices, and Systems Jun. 24–26 1991 McMaster University, Hamilton, Ontario, Canada by Lai both of which are incorporated herein by reference. However such a device requires a large drive voltage generally on the order of 50 volts. This large voltage rather than the channel length, limits the frequency due to difficulties in generating the required drive voltages. Because of the high voltage and the power losses associated with the operation of these devices, these devices have not found wide application.

BRIEF DESCRIPTION OF THE PRESENT INVENTION

The present invention relates to an optical switch. More particularly the present invention relates to an optical switch having a reduced power consumption compared with a conventional conducting plate type optical switch.

Broadly the present invention relates to an optical switch comprising electro-optic material having a main waveguide formed therein, said main waveguide having a longitudinal axis, a pair of secondary waveguides formed in said electro-optic material, said secondary waveguides branching from said main waveguide as mirror images on opposite sides of said longitudinal axis to and converging at a junction at one end of said main waveguide to form a Y structure, a potential applying resonator conductor means for generating a resonant voltage, said resonator conductor means having a pair of legs interconnected by a connecting portion, a first leg of said pair of legs operatively associated with said main waveguide and its adjacent one of said secondary waveguides in the area of said junction, a second leg of said pair of legs operatively associated with said main waveguide and the other of said pair of secondary waveguides in the area of said junction, said operative association between said first leg and said main waveguide and said one secondary waveguide and said operative association between said second leg and said main waveguide and said other secondary waveguide directing flow of light between said main waveguide and said adjacent one or said other of said secondary waveguides when said first and said second legs have an appropriate potential between them.

Preferably said connecting portion interconnecting said legs will extend between a pair of adjacent ends of said legs.

More preferably the impedances of said legs and said connecting portion should be matched as required to minimize the power loss in the resonator.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
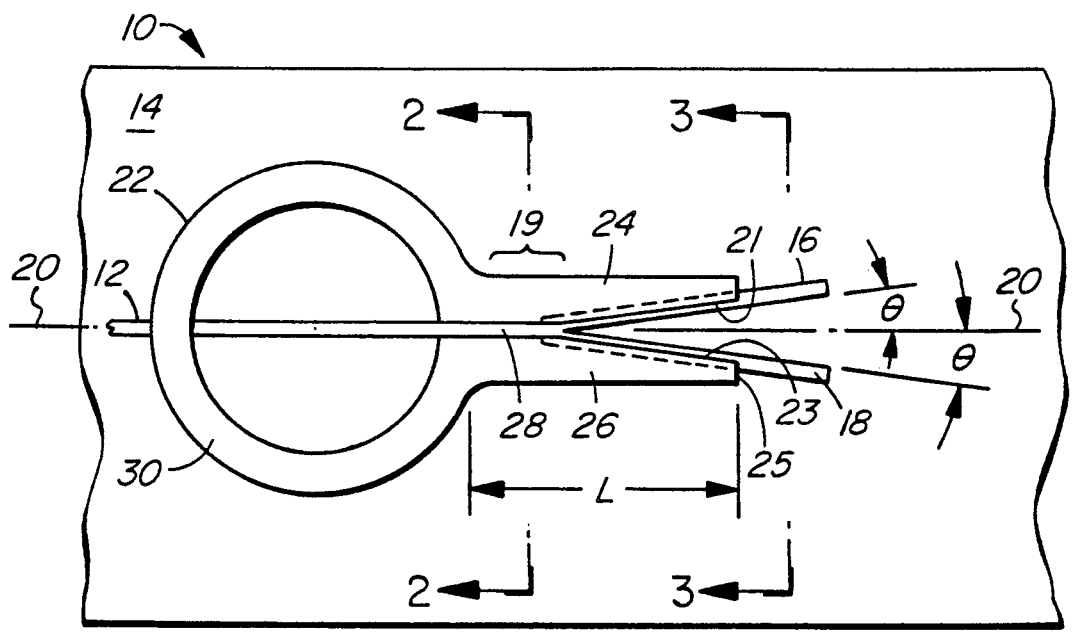
FIG. 1 is a plan of the present invention showing the resonator in overlying relationship with the waveguides formed in an electro-optic material.
Figure 2:
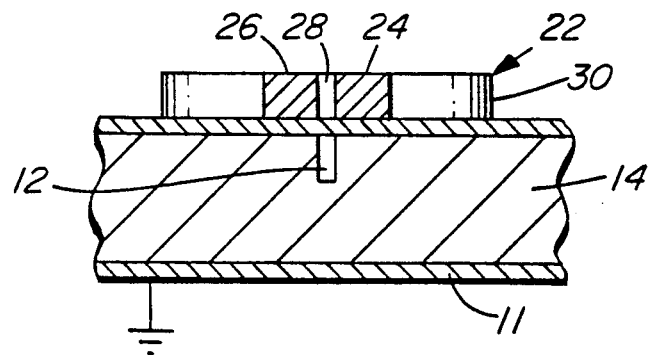
FIG. 2 is a section along the line 2—2 of FIG. 1.
Figure 3:
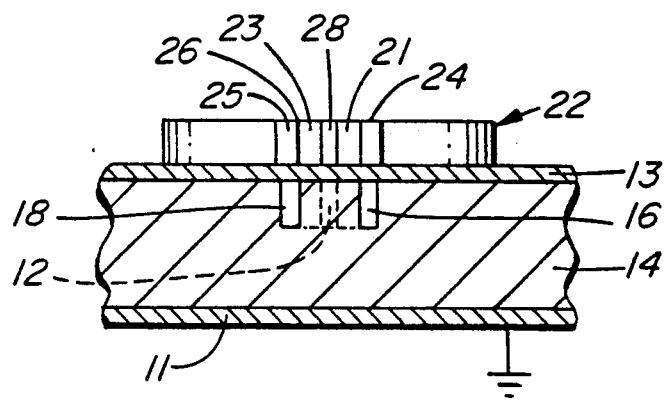
FIG. 3 is a section along the line 3—3 of FIG. 1.

As shown in the figures the present invention relates to an optical switch 10 wherein appropriately polarized light passing through a main optical waveguide 12 formed in an electro-optic substrate 14 (e.g. Z cut lithium niobate) is divided into a pair of waveguides 16 and 18 positioned symmetrically with respect to the longitudinal axis 20 of the main waveguide 12 to form a Y. The secondary waveguide 16 extends at an angle $\Theta$ relative to the longitudinal axis 20 and the second secondary waveguide 18 extends at a similar angle $\Theta$ on the opposite side of the longitudinal centre line 20 so that the waveguides 16 and 18 are mirror images on opposite sides of the longitudinal centre line 20 and form a junction generally indicated by the area 19. Usually, the substrate 14 is mounted on a suitable grounding plate 11.

The angles $\Theta$ are relatively small so that $2\Theta$ is in the order of less than approximately 3 degrees.

An optical buffer layer 13 closes the sides of the main waveguide 12 and secondary waveguides 16 and 18 and is interposed between a resonator 22 and the substrate 14. The resonator 22 is formed by a pair of substantially parallel legs 24 and 26 with a gap 28 therebetween and interconnected by a connecting section 30 and is mounted with the legs 24 and 26 operatively associated with the main waveguide 12 and the secondary waveguides 16 and 18 as will be described below. The legs 24 and 26 are symmetrically positioned relative to and are parallel with the longitudinal axis 20 of the main waveguide 12 and preferable the portions of the legs 24 and 26 in operative association with the secondary waveguides 16 and 18 have their adjacent faces flaring away from each other along lines substantially parallel with the longitudinal axes of the waveguides 16 and 18 respectively as illustrated at 21 and 23.

The two legs 24 and 26 and connecting portion 30 form a ½ wave resonator or an odd multiple of the ½ wavelength resonator. The legs 24 and 26 are of equal length and are of a length L to effectively influence the flow of light so that the flow of light from the main waveguide 12 is biased into the secondary waveguides 16 or 18 associated (adjacent to) with the leg which is at that time at the appropriate potential. It will be apparent that the resonator 22 alternatively has an appropriate polarity of voltage between the legs 24 or 26 and immediately thereafter (depending on the frequency) an opposite polarity of voltage between the legs 24 or 26 to direct the flow of light between the main waveguide 12 and the secondary waveguides 16 and 18. This oscillation of the voltage between the legs 24 and 26 causes more light (assuming flow is from the main waveguide 12) toward the secondary waveguides 16 and 18, the switch will also function with flow in opposite direction) to be directed into one of the secondary waveguides 16 and 18 and then into the other, thereby to divide the light flowing through the main waveguide 12 into a plurality of discrete pulses in each of the secondary waveguides 16 and 18. The switch is also useful for directing formed pulses to flow in the desired direction e.g. into one or the other of the secondary waveguides 16 or 18 from the main waveguide 12 or from one or the other of the secondary waveguides 16 and 18 into the main waveguide while reducing losses.

The resonator 22 may be constructed as any suitable resonator provided it influences the flow of light between the main waveguide 12 and the secondary waveguides 16 and 18 to direct as above described the flow of light or light pulses between the main waveguide 12 and the secondary waveguides 16 and 18.

It is preferred to design the resonator for optimum efficiency i.e. to minimize the electrical losses while imparting the required influences on the light flowing through the main waveguide to divide it into pulses in or direct formed pulses into the secondary waveguides 16 and 18.

The design of the preferred form of resonator 22 is based on determining the length L of the legs 24 and 26 (measured from the free end 25 of the leg(s) to their interconnection with the connecting portion 30) to provide the desired influence on the light in the waveguides 12, 16 and 18 and matching the impedance of the connecting portion 30 with that of the legs 24 and 26. The length L and position of the legs 24 and 26 for any given system may be determined in essentially the same way as these factors are determined for conducting plates used to influence the flow of light between a main waveguide and one or the other of a pair of secondary waveguides in the above described optical switches such as those described in the Jaeger et al and Lai papers referred to on page 1 and incorporated herein by reference.

The resonator 22 preferably is designed with the impedance of said pair of legs 24 and 26 matched with the impedance of the connecting portion 30 at their intersection. This tends to improve the operation and thereby reduce power consumption.

The precise shape of the connecting portion 30 is not critical, however, it is preferred it be in the form of a loop curving smoothly into each of the legs 24 and 26 at the transition between the connecting portion 30 and the legs 24 and 26 and that the looped connecting portion 30 have a substantially circular conducting path.

Power is applied to the resonator 22 in a conventional manner, matching the impedance of the incoming power line with that of the resonator 22 as required.

In operation when the appropriate potential is on the leg 24 the light flowing in the main wave section 12 tends to be deflected into the secondary waveguide 16 to form or direct a pulse in this waveguide 16, on the other hand when the appropriate potential is applied to the leg 26 the light flowing in the main waveguide 12 tends to be deflected into the secondary waveguide 18 e.g. to form a pulse therein or direct pulses flowing in the waveguide 12 into the waveguide 18. As above indicated the appropriate operating potential is oscillated back and forth from one leg 24 to the other leg 26 dependent on the frequency of oscillation of the electric field in the resonator 22.

Having described the invention, modifications will be evident to those skilled in the art without departing from the spirit of the invention as defined in the appended claims.

We claim:

1. An optical switch comprising electro-optic material having a main waveguide formed therein, said main waveguide having a longitudinal axis, a pair of secondary waveguides formed in said electro-optic material, said secondary waveguides branching from said main waveguide as mirror images on opposite sides of said longitudinal axis and converging at a junction at one end of said main waveguide to form a Y structure, a potential applying resonator conductor, means for generating a resonant voltage, said resonator conductor means having a pair of legs interconnected by a connecting portion, a first leg of said pair of legs operatively associated with said main waveguide and its adjacent one of said secondary waveguides, a second leg of said pair of legs operatively associated with said main waveguide and the other of said pair of secondary waveguides, said operative association between said first leg and said main waveguide and said one secondary waveguide and said operative association between said second leg and said main waveguide and said other secondary waveguide directing flow of light between said main waveguide and said adjacent one or said other of said secondary waveguides when said first and said second leg have an appropriate potential between them.

2. An optical switch as defined in claim 1 wherein said connecting portion interconnects adjacent ends of said legs.

3. An optical switch as defined in claim 2 wherein each of said first and said second legs have essentially the same length measured from their free ends remote from said connecting portion to their respective connections to said connecting portion.

4. An optical switch as defined in claim 3 wherein the impedances of said pair of legs and that of said connecting portion are matched as required to minimize the power loss in the resonator.

5. An optical switch as defined in claim 2 wherein the impedances of said pair of legs and that of said connecting portion are matched as required to minimize the power loss in the resonator.

6. An optical switch as defined in claim 1 wherein the impedances of said pair of legs and that of said connecting portion are matched as required to minimize the power loss in the resonator.

* * * * *